United States Patent
Henry et al.

(10) Patent No.: US 9,519,065 B2
(45) Date of Patent: Dec. 13, 2016

(54) SYSTEMS AND METHODS FOR DETERMINING GEOGRAPHIC LOCATION OF A MOBILE DEVICE

(75) Inventors: Paul Henry, Holmdel, NJ (US); Christopher Rice, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/478,139

(22) Filed: May 23, 2012

(65) Prior Publication Data

US 2012/0229340 A1 Sep. 13, 2012

Related U.S. Application Data

(62) Division of application No. 12/638,805, filed on Dec. 15, 2009, now abandoned.

(51) Int. Cl.
| | |
|---|---|
| *G01S 19/05* | (2010.01) |
| *G01S 19/25* | (2010.01) |
| *G01S 19/34* | (2010.01) |
| *G01S 19/49* | (2010.01) |

(52) U.S. Cl.
CPC ............. *G01S 19/49* (2013.01); *G01S 19/05* (2013.01); *G01S 19/25* (2013.01); *G01S 19/34* (2013.01)

(58) Field of Classification Search
CPC .......... G01S 19/05; G01S 19/25; G01S 19/49; G01S 19/34
USPC .......................... 342/357.42, 357.64, 357.32
See application file for complete search history.

(56) References Cited

U.S. PATENT DOCUMENTS

| | | | | |
|---|---|---|---|---|
| 5,225,842 | A | * | 7/1993 | Brown et al. ............ 342/357.46 |
| 5,663,734 | A | * | 9/1997 | Krasner .................. 342/357.25 |
| 6,014,610 | A | * | 1/2000 | Judge et al. .................... 702/92 |
| 6,067,045 | A | * | 5/2000 | Castelloe et al. ........ 342/357.43 |
| 6,313,787 | B1 | * | 11/2001 | King et al. ............... 342/357.42 |
| 2002/0019698 | A1 | * | 2/2002 | Vilppula et al. ......... 342/357.08 |
| 2002/0138650 | A1 | * | 9/2002 | Yamamoto et al. .......... 709/245 |

(Continued)

OTHER PUBLICATIONS

H. Abbott et al., Land-vehicle navigation using GPS, Proceedings of the IEEE, vol. 87(1), p. 145-162, 1999.*

(Continued)

*Primary Examiner* — Tashiana Adams
*Assistant Examiner* — Fred H Mull
(74) *Attorney, Agent, or Firm* — Hartman & Citrin LLC

(57) ABSTRACT

A method for determining geolocation of a mobile device, and a system for performing the method. The mobile device includes a location component, a local positioning component, and a reference positioning component. The method includes determining a local-positioning period based on an identified factor, and obtaining a location fix for the device from the reference positioning component. The method further includes commencing the period and measuring movement using the location component. The method also includes determining a present location of the device, using the location component, based on the location fix and the movement data and, during the period, repeating the measuring and determining steps. The method further includes, after the period expires, updating the location fix with a new location fix from the reference positioning component, resetting the local-positioning period; and repeating the steps for determining location during the reset period using the new location fix.

12 Claims, 3 Drawing Sheets

(56) References Cited

U.S. PATENT DOCUMENTS

| | | | |
|---|---|---|---|
| 2003/0134646 A1* | 7/2003 | Forrester | 455/456 |
| 2005/0275587 A1* | 12/2005 | Siegel et al. | 342/357.06 |
| 2007/0120737 A1* | 5/2007 | Moilanen et al. | 342/357.09 |
| 2009/0009397 A1 | 1/2009 | Taylor et al. | |
| 2009/0061898 A1* | 3/2009 | Johnson et al. | 455/456.2 |
| 2009/0125517 A1* | 5/2009 | Krishnaswamy | G06Q 30/02 |
| 2009/0278738 A1* | 11/2009 | Gopinath | 342/357.12 |

OTHER PUBLICATIONS

A. Rahmati et al., Understanding Human-Battery Interaction on Mobile Phones, MobileHCI'07, Sep. 2007.*
Omerbashich et al. "Integrated INS/GPS Navigation From a Popular Perspective", J Air Transportation, 7:1 (2002).
Cramer, Michael "GPS/INS Integration", Photogrammetric Week, Wichmann Verlag, Heidelberg (1997).
Location Studio 2.1—MLP 3.0.0 Developer's Guide, Openwave Systems, Inc.
El-Sheimy et al. "The Promise of MEMS to the Navigation Community", Dept of Geomatics Engineering—The Univ. of Calgary, www.insidegnss.com (Mar./Apr. 2007).

* cited by examiner

SYSTEMS AND METHODS FOR DETERMINING GEOGRAPHIC LOCATION OF A MOBILE DEVICE

CROSS REFERENCE TO RELATED APPLICATION

This application is a Divisional of U.S. application Ser. No. 12/638,805, filed Dec. 15, 2009, now abandoned, the entirety of which is incorporated herein by reference.

TECHNICAL FIELD

The present disclosure relates generally to determining geographic location of a mobile device and, more particularly, to systems and methods for determining geographic location of a mobile device including an onboard locating device obtaining location fixes according to a strategy to conserve power while achieving desired accuracy.

BACKGROUND

Conventional positioning systems for mobile devices, such as dedicated navigation device and smart phones having navigation components, such as a global positioning systems (GPS) receiver, require continuous reception and processing of external signals to calculate device location. These systems can provide highly accurate geographic positioning, but consume large amounts of battery power. For example, though some mobile devices have standby times, or "on" times of about 100 hours or more, they can only operate about 2 to 4 hours with GPS running continuously. These positioning systems also depend on an ability to receive the positioning signals, and users can become lost or miss a turn when signal strength is weak.

Onboard systems for measuring movement of the mobile device, such as an inertial navigation unit (INU), use much less power and provide highly accurate displacement information for a period of time. Location of the mobile device can be determined based on a location fix, such as from a GPS unit and the measured movements. Use of movement-measuring systems, such as INUs, has increased in recent years due to their low power usage, increasing accuracy, and decreasing cost. INUs, though, suffer integration drift: slight errors accumulating with time. Eventually, the resulting location becomes unreliable. For this reason, INUs are typically used only as a backup to GPS in a mobile device for providing positioning information when the GPS is out of coverage (e.g., in a coverage shadow of a tunnel or building).

A positioning system intelligently leveraging the benefits of both movement-measuring and signal-dependent positioning subsystems would greatly improve the ability to accurately determine location of a mobile device for long periods of time. Such a system would also enhance the effectiveness of location-based services (LBSs).

SUMMARY

The present disclosure relates to a method for determining geolocation of a mobile device including a location component, a local positioning component, and a reference positioning component. The method includes determining a local-positioning period based on an identified factor, and obtaining a location fix for the device from the reference positioning component. The method further includes commencing the period and measuring movement using the local component. The method also includes determining a present location of the device, using the location component, based on the location fix and the movement data and, during the period, repeating the measuring and determining steps. The method further includes, after the period expires, updating the location fix with a new location fix from the reference positioning component, resetting the local-positioning period; and repeating the steps for determining location during the reset period using the new location fix.

In another aspect, the present disclosure relates to a mobile device including a processor, a local positioning component configured to measure movement of the mobile device, and a reference position component configured to determine geographic location of the mobile device. The device further includes a location component operatively linked to the processor, the local positioning component, and the reference positioning component, and having computer-readable instructions. The computer-readable instructions are executable by the processor to make the location component operable to receive a location fix from the reference positioning component, commence a local-positioning period, receive movement data from the local positioning component corresponding to movement of the mobile device, and determine a present location of the mobile device based on the location fix and the received movement data during the local-positioning period. The computer-readable instructions are further operable to make the processor operable to, after the local-positioning period, receive a new location fix, reset the local-positioning period, and continue to determine the present location of the mobile device based on the new location fix and movement data from the local positioning component until the local-positioning period is reset.

In yet another aspect, the present disclosure relates to a computer-readable medium for use in determining location of a mobile device. The computer-readable medium stores instructions executable by a processor in order to make the processor operable to receive a location fix from a reference positioning component, commence a local-positioning period corresponding to an identified accuracy for locating the mobile device, and receive movement data from a local positioning component of the mobile device, the movement data corresponding to movement of the mobile device. The instructions also cause the processor to determine a present location of the mobile device based on the location fix and the received movement data during the local-positioning period. Further, the instructions cause the processor to, after the local-positioning period, receive a new location fix, reset the local-positioning period, and continue to determine the present location of the mobile device based on the new location fix and new movement data from the local positioning component until passage of the reset local-positioning period.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, mini-computers, mainframe computers, personal computers, hand-held computing devices, microprocessor-based, programmable consumer electronics, combinations thereof, and the like.

Overview of the Disclosure

In various embodiments, the present disclosure describes a mobile device including a location component, a local positioning component, such as an inertial navigation system, and a reference positioning system, such as a GPS receiver. The location component is configured to determine geographic location of the mobile device using a combination of data from the local positioning component and the reference positioning component according to a strategy. The strategy includes determining a local-positioning time period corresponding to a desired accuracy of location determination. During the local-positioning time period, the local positioning component determines position based on a most-recent location fix from the reference position component and movement data from the local positioning component. The strategy may be based on any one or more of a plurality of factors, including remaining battery life, preferences of a user or administrator, required locating accuracy, and others, as described in more detail below. Using the systems and methods of the present disclosure, the location of a mobile device can be determined at a desired high accuracy while conserving mobile device battery life.

Mobile Device Overview

Figure 1:
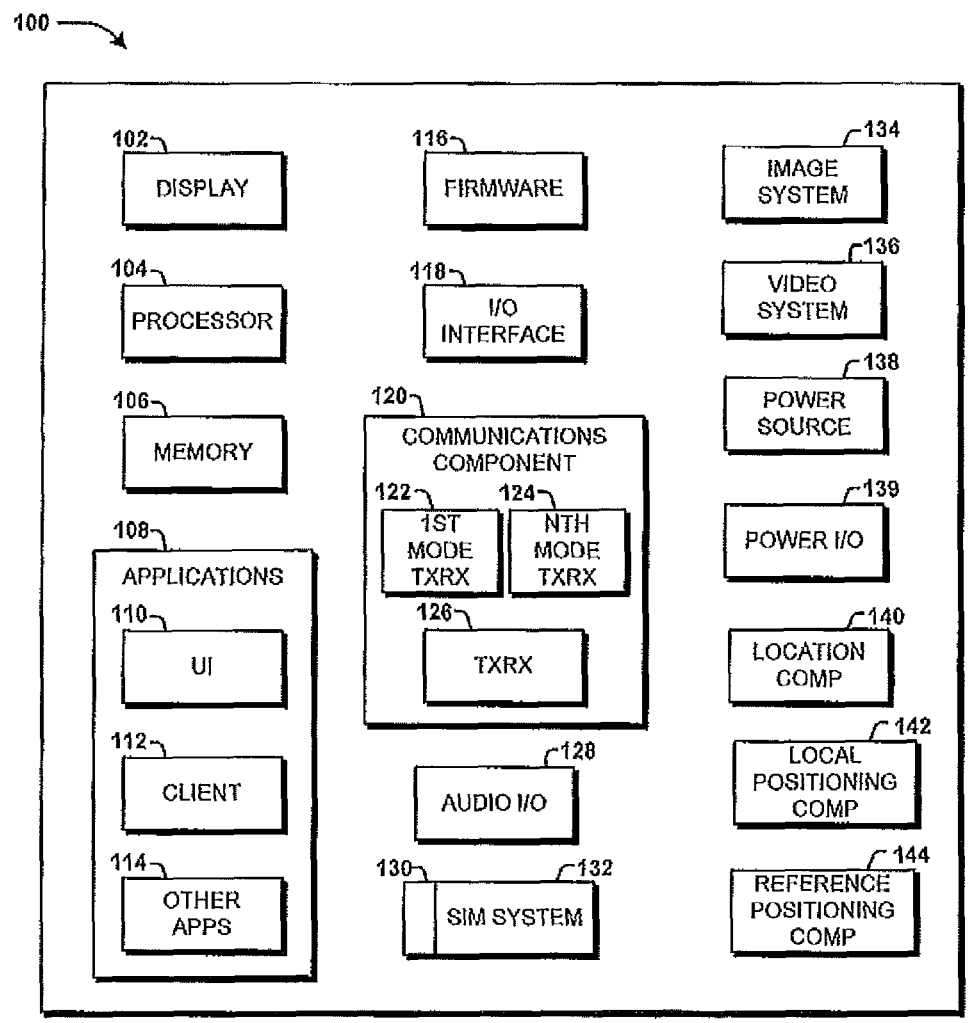
FIG. 1 illustrates an exemplary mobile device and components thereof, according to an embodiment of the present disclosure.

Now turning to the figures, and more particularly to the first figure, FIG. 1 illustrates a schematic block diagram of an exemplary mobile device 100 for use in accordance with embodiments of the present disclosure. The mobile device 100 may be, for example, a smart phone or dedicated navigation device.

Although connections are not shown between all of the components illustrated in FIG. 1, the components can interact with each other to carry out device functions. In some embodiments, for example, the components are arranged so as to communicate via one or more busses (not shown). It should be understood that FIG. 1 and the following description are intended to provide a general understanding of a suitable environment in which the various aspects of some embodiments of the present disclosure can be implemented.

In some embodiments, the mobile device 100 is a multi-modal headset and has a variety of computer readable media, including, for example, volatile media, non-volatile media, removable media, and non-removable media. The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 100.

As illustrated in FIG. 1, the mobile device 100 includes a display 102 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like. The illustrated mobile device 100 also includes a processor 104 for controlling, processing data, and/or executing computer-executable instructions of one or more applications, and a memory 106 for storing data and/or one or more applications 108. In some embodiments, the memory 106 stores information associated with determining location of the mobile device 100 according the methods described herein. For example, the memory 106 may store information including user preference factors and/or administrative factors set by an administrator, manufacturer, or service provider, which are described in more detail below.

In some embodiments, the application(s) 108 include a user interface (UI) application 110. The UI application 110 interfaces with a client 112 (e.g., an operating system (OS)) to facilitate user interaction with device functionality and data. In some embodiments, the client 112 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 110 aids the user in entering message content, viewing received messages, answering/initiating calls, entering/deleting data, entering and setting user IDs and passwords, configuring settings, manipulating address book content and/or settings, interacting with other applications 114, and the like. In some embodiments, the other applications 114 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 108 are stored in the memory 106 and/or in a firmware 116, and can be executed by the processor 104. The firmware 116 can also store code for execution during device 100 power up, for example.

The illustrated mobile device 100 also includes an input/output (I/O) interface 118 for input/output of data, such as, for example, user IDs, passwords, and application initiation (start-up) requests. In some embodiments, the I/O interface 118 is a hardwire connection, such as, for example, a USB, mini-USB, audio jack, PS2, IEEE 1394, serial, parallel, Ethernet (RJ48) port, RJ11 port, or the like. In some embodiments, the I/O interface 118 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 118 can be used for communications between the mobile device 100 and a network or local device, instead of, or in addition to, a communications component 120.

The communications component 120 interfaces with the processor 104 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 120 includes a multimode communications subsystem for providing cellular communications via different cellular technologies. In some embodiments, for example, a first cellular transceiver 122 operates in one mode, such as, Global System for Mobile communications (GSM), and an Nth cellular transceiver 124 operates in a different mode, such as Universal Mobile Telecommunications System (UMTS). While only two cellular transceivers 122, 124 are illustrated, the mobile device 100 may include more than two transceivers.

The illustrated communications component 120 also includes a transceiver 126 for use by other communications technologies such as, for example, WIFI, WIMAX, BLUETOOTH, infrared, infrared data association (IRDA), near field communications (NFC), RF, and the like. In some embodiments, the communications component 120 also facilitate reception from terrestrial radio networks, digital satellite radio networks, Internet-based radio services networks, combinations thereof, and the like. The communications component 120 can process data from a network such as, for example, the Internet, an intranet, a home broadband network, a WIFI hotspot, and the like, via an ISP, DSL provider, or broadband provider.

In some embodiments of the present invention, audio capabilities for the mobile device 100 are provided by an audio I/O component 128 including a speaker to output audio signals and a microphone to receive audio signals.

The illustrated mobile device 100 also includes a slot interface 130 for accommodating a subscriber identity system 132 such as, for example, a subscriber identity module (SIM) card, a universal SIM (USIM) card, or a universal integrated circuit card (UICC). Alternatively, the subscriber identity system 132 can be manufactured into the device 100, thereby obviating the need for a slot interface 130. In some embodiments, the subscriber identity system 132 stores information associated with determining location of the mobile device 100 according the methods described herein. For example, the subscriber identity system 132 may store information including user preference factors and/or administrative factors set by an administrator, manufacturer, or service provider, which are described in more detail below. In some embodiments, the subscriber identity system 132 is programmed by a manufacturer, a retailer, a user, a computer, a network operator, or the like.

The illustrated mobile device 100 also includes an image capture and processing system 134 (image system). Photos can be obtained via an associated image capture subsystem of the image system 134, for example, a camera. The illustrated mobile device 100 also includes a video system 136 for capturing, processing, recording, modifying, and/or transmitting video content.

The illustrated mobile device 100 also includes a power source 138, such as batteries and/or other power subsystem (AC or DC). The power source 138 can interface with an external power system or charging equipment via a power I/O component 139.

The illustrated mobile device 100 also includes a location component 140 for use in determining geographic location of the mobile device 100. In some embodiments the location component 140 is associated with a location application, such as by the location component including the location application, or the location application including the location component. The mobile device 100 also includes a local positioning component 142 and a reference positioning component 144. The location component 140 may in some embodiments be considered one of the applications 108 of the mobile device 100. As described below in more detail, the local positioning component 142 is in some embodiments an inertial navigation unit, and the reference positioning component 144 is in some embodiments a GPS unit. The location component 140 obtains movement data from the local positioning component 142 and selectively accesses the reference positioning component 144 for accurately determining the geographic location of the mobile device 100 while conserving power, as described more below.

In some embodiments, the location component 140, also known in some embodiments as a location services application (LSA), includes the local positioning component 142 and the reference positioning component 144, and in other embodiments, the local positioning component 142 and/or the reference positioning component 144 are separate from the location component 140. By way of example, while the local positioning component 142 and the reference positioning component 144 are shown separate from the location component 140 in FIG. 1, in contemplated embodiments, the local positioning component 142 and/or the reference positioning component 144 are subparts of the location component 140. Thus, descriptions of the components 140, 142, 144 as separate components, herein, including in the claims, include the case in which one, two, or all three of the components are combined.

Communications System Overview

Figure 2:
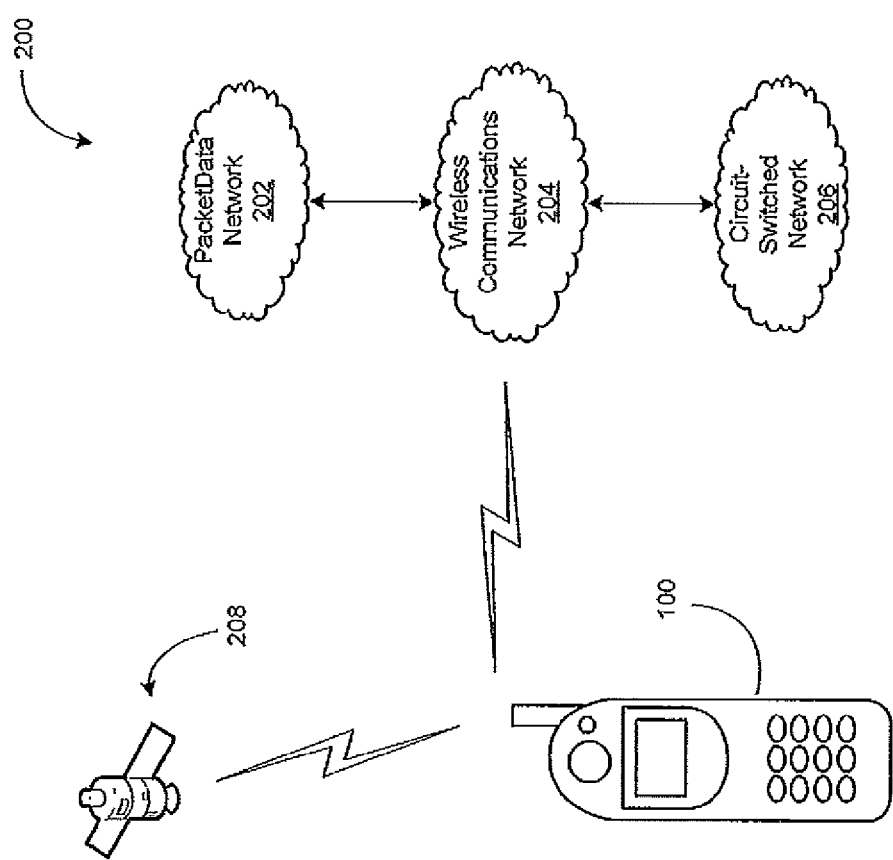
FIG. 2 illustrates an exemplary network including a geo-location server, according to an embodiment of the present disclosure.

In some embodiments of the present disclosure, the mobile device 100 is configured to communicate with a communications system 200 including a packet data network 202, as shown in FIG. 2. The packet data network 202 may include a packet-switched network, such as the Internet. In some embodiments, the communications system 200 includes a circuit-switched network 206, such as a publicly-switched telephone network (PSTN).

The mobile device 100 communicates with the packet data network 202 by way of a wireless communications network 204, using its communications component 120, for example. The mobile device 100 may communicate with the packet data network 202 for voice services (e.g., voice-over-Internet protocol (VOIP)), accessing the Internet and obtaining services, such as location-based services (LBS). As described above, the mobile device 100, in some embodiments, includes various applications, which may be used to access services for the mobile device 100. In some embodiment, the device 100 communicates with external positioning devices, such as GPS satellites 208, as described in more detail below.

In some embodiments, the communications system 200 includes one or more servers configured to receive requests for services from the mobile device 100 and to provide services to the mobile device 100. For example, in some embodiments, the communications system 200 includes a location server and/or mobile location platform (not shown in detail) for providing location-related information to and/or receiving location-related information from the location component 140 of the mobile device 100. The location server or mobile location platform may provide, for example, information to the mobile device 100 for use by the mobile device 100 in determining location according to assisted GPS (A-GPS), differential GPS (D-GPS), triangulation, or other technique.

Wireless Communications Network

The mobile device 100 communicates with the packet data network 202 by way of a wireless communications network 204. In some embodiments of the present disclosure, the wireless communications network 204 shown in FIG. 2 includes a cellular network. In the described exemplary embodiments, the wireless communications network 204 is described as a cellular network, though alternative and/or additional networks, such as WIFI and WIMAX, are contemplated.

As a cellular network, the wireless communications network 204 includes components such as, but not limited to, base transceiver stations (BTSs), Node-B's, Personal Communications Services (PCS) station, other base stations or cell sites, base station controllers (BSCs), radio network controllers (RNCs), mobile switching centers (MSCs), short message service centers (SMSCs), multimedia messaging service centers (MMSCs), home location registers (HLRs), visitor location registers (VCRs), charging platforms, billing platforms, voicemail platforms, GPRS core network components, location service nodes, Internet protocol multimedia subsystem (IMS) components, other nodes and components, and the like. The cellular network also includes radios and nodes for receiving and transmitting voice, data, and combinations thereof to and from radio transceivers, networks, and the Internet.

In some embodiments, the wireless communication network 204 is configured as a 2G GSM (Global System for Mobile communications) network, and provides data communications via GPRS (General Packet Radio Service) and/or EDGE (Enhanced Data rates for GSM Evolution). In some embodiments, the cellular network is configured as a 3G UMTS (Universal Mobile Telecommunications System) network and provides data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network is also compatible with future mobile communications standards including, but not limited to, pre-4G, and 4G (e.g., LTE (Long Term Evolution)), for example.

It should be appreciated that in some embodiments substantially all of the functionality described with reference to the wireless communications network 204 is performed by a cellular network alone, or in combination with other networks, network elements, and the like, and that some elements are not illustrated. While the wireless communications network 204 will be described herein as a cellular network, it should be understood that other networks, such as WIFI and WIMAX, are possible and are contemplated.

The communications system 200 may also include processors (e.g., servers; not shown in detail) configured to (i) receive requests for location information from the mobile device 100, (ii) receive other communications from the mobile device 100 regarding location or provisioning of such location information, (iii) formulate information related to the location of the mobile device 100, and/or (iv) provision the mobile device 100 with such location information. The processor may be, for example, a location server, or a mobile location platform.

Local Positioning Component

The local positioning component 142 onboard the mobile device 100 measures movement of the mobile device 100 and produces movement data corresponding to the measured movement. The local positioning component 142 includes hardware or a combination of hardware and software. As described more below, the local positioning component 142 hardware (e.g., accelerometers and gyroscopes) senses movement of the mobile device 100 and a processor (e.g., a microprocessor) processes the sensed movements to produce movement data corresponding to the movements. In some embodiments, the processor, and corresponding software for processing the sensed movements is a part of the local positioning component 142 and in some embodiments the processor, and corresponding software, is separate from the local positioning component 142. As an example of the latter case, in some embodiments the processor 104 of the mobile device 100 processes the sensed movements.

In some embodiments, the local positioning component 142 includes an inertial navigation unit (INU), such as a micro-electromechanical system for inertial navigation (MEMS-IN), nano-electromechanical system for inertial navigation (NEMS-IN), or the like. INUs are also referred to as inertial guidance systems (IGSs), inertial reference platforms (IRPs), inertial measurement units (IMUs), and inertial reference units (IRUs).

Although the local positioning component 142 is primarily described herein as including an INU, and sometimes particularly as including a MEMS-IN, the local positioning component 142 may include any type of positioning component onboard the mobile device 100 capable of measuring movement of the device 100.

The local positioning component 142 includes any one or more of a variety of motion sensors. For example, in some embodiments the local positioning component 142 includes one or more linear motion sensors, such as accelerometers, and one or more angular-motion sensors, such as gyroscopes. Such motions sensors are commonly referred to collectively as a platform or a module of INUs. Though the sensors of the local positioning component 142 could measure movement of the mobile device 100 in other ways, in some embodiments the sensors measure changes in linear acceleration (i.e., changes in linear velocity) and changes in angular acceleration (i.e., changes in angular velocity about an axis to produce pitch, roll, or yaw).

Acceleration information, linear and angular, can be integrated by the processor (e.g., processor 104 or processor of the local positioning component 142) to produce corresponding velocity information, which can be further processed to produce displacement information. In some embodiments, linear and/or angular velocity is measured and integrated to produce the position information, without the motion sensor(s) measuring acceleration. The term movement data, as used herein, may refer to any one or more of: linear and angular acceleration information, velocity information, and displacement information.

Reference Positioning Component

The location component 140 of the mobile device 100 accesses the reference positioning component 144 as part of determining geographic location of the mobile device 100. In some embodiments, the reference positioning component 144 is a part of the location component 140, and in other embodiments, the reference positioning component 144 is separate from the location component 140.

A variety of reference positioning components may be used for determining geographic location of the mobile device 100. For example, in some embodiments, the reference positioning component 144 includes a global navigation satellite system (GNSS) receiver or transceiver to receive, or receive and send signals from/to satellites 208 (shown in FIG. 2) of a GNSS. As an example, the reference positioning component 144 may include GPS or an improvement thereon, such as assisted GPS (A-GPS), enhanced GPS (E-GPS), or differential GPS (D-GPS). The reference positioning component 144 may also be configured to send and/or receive signals to/from a WIFI system, WIMAX, and/or a wireless network to determine position by triangulation or other methods. In some embodiments, the location component 140 interfaces with cellular network nodes, satellites, location transmitters and/or beacons, wireless network transmitters and receivers, such as WIFI hotspots, radio transmitters, combinations thereof, and the like. The reference positioning component 144 may be configured to use more than one form of position determination, such as by being configured to determine position using GPS, triangulation, and WIFI, separately and/or in any combination.

Using the location component 140, the mobile device 100 obtains, generates, and/or receives data as part of identifying mobile device location, or transmits data used by other devices (e.g., location server or mobile locating platform) to determine the mobile device 100 location.

Intelligent INU-Based Positioning

In some embodiments, the location component 140 determines geographic location of the mobile device 100 using a combination of data from the local positioning component 142 and reference positioning component 144. The location component 140, which in some embodiments of the present disclosure includes the local positioning component 142 and/or the reference positioning component 144, as described above, accesses output from the local positioning component 142 and the reference positioning component 144 for determining location of the mobile device 100 at a desired high accuracy while conserving mobile device 100 power.

Though the systems and methods of the present disclosure are described primarily with reference to embodiments in which parameters for determining location of the mobile device 100 are stored and processed on the mobile device 100, it is contemplated that the parameters may be stored and processed, at least in part, on a remote server, such as a location server or mobile locating platform. For some of the embodiments in which the accuracy parameters are stored in the mobile device 100, the location component 140 can operate without direct interaction with a remote server, such as a location server or mobile locating platform, though in some embodiments the location component 140 and the location server or mobile locating platform are configured to communicate for determining the location information.

For embodiments in which the accuracy parameters are stored in the location server or mobile locating platform (or other server remote to the mobile device 100), location server or mobile locating platform provides location instructions to the location component 140, such as instructions identifying the accuracy at which to determine location of the mobile device 100.

As described above, the reference positioning component 144, such as GPS, have benefits including the ability to determine location with high accuracy, but downsides including a large power requirement resulting in high power consumption during continuous GPS positioning, thereby drastically reducing battery life. Another downside of such reference positioning components 144 is reliance on coverage to receive signals (e.g., GPS signals).

The local positioning component 142, such as an INU, on the other hand, has the benefit of low power consumption, but a downside of error accumulation with time during use. As described above, though the local positioning component 142 is described primarily herein with reference to an INU, and particularly to a MEMS-IN, the descriptions are merely exemplary and the present disclosure is not limited to MEMS-INs, or even INUs, generally.

INUs are also independent from external signals, such as GPS signals and signals from a wireless communications network. Because INUs measure movement of the mobile device 100 and not location, per se, knowledge of an initial location is needed. The reference positioning component 144 is configured to provide this initial location, also referred to as an initial fix or reference. Once the initial location of the mobile device 100 is determined, such as via GPS, the location component 140 can continue to determine location of the mobile device 100 using the initial location and movement data corresponding to linear and angular displacements of the mobile device 100 following the initial fix. Though the price and accuracy of INUs, such as MEMS-INs, have improved markedly in recent years, the need for an initial location fix, such as from a GPS device, and the error that increases with time makes it presently impractical for them to be the sole positioning component of the mobile device 100.

The location component 140 continues to determine location of the mobile device 100 using the initial fix and movement data from the local positioning component 142 until an accumulated error in the local positioning component 142 exceeds a determined threshold error. Because the local positioning component 142 reaches the threshold error during movements of the mobile device 100 during a corresponding amount of time, it can be seen that the location component 140 can continue to determine location of the mobile device 100 based on the initial fix and the movement data from the local positioning component 142 from the time of the initial fix until such threshold amount of time expires. Once the threshold error has been reached (i.e., once the corresponding threshold time period has elapsed), the location component 140 obtains a new location fix from the reference positioning component 144, and then continues to determine location of the mobile device 100 using the new location fix and the movement data continuously received from the local positioning component 142.

The threshold error or time period may be calculated in a variety of ways. Error of a present-day MEMS-IN can be represented generally by:

$$E=(St^3)^{1/2}, \qquad (1)$$

wherein:
  t is time,
  S is the spectral or noise density of the MEMS-IN, and
  E is accumulated error through time t.
It is further understood that the spectral density S of a present-day MEMS-IN is about $10^{-8}$ m$^2$/sec$^3$.

Because of ongoing improvements in INU technology, equation (1) and the noise density S will change. The general idea is that an amount of error that will accumulate in the local positioning component 142 can be accurately predicted with respect to time.

As described, a threshold error of the local positioning component 142 can correspond to a threshold amount of time that it will take for error in the local positioning component 142 to accumulate to the threshold error. As an example, according to equation (1) and the cited spectral density S, the accumulated error E of the MEMS-IN will reach about 5 meters (i.e., E≈5 meters) after about 20 minutes (i.e., t=1,200 seconds). Similarly, the equation can be solved for accumulated error E given a specific time period t. For example, for given a specific error E accumulating over a given period of time t, such as 20 minutes, equation (1) and the cited spectral density of the MEMS-IN can be used to determine that the estimated error, 20 minutes after a fix from reference positioning component 144, will be about 5 meters.

If a positioning accuracy within a certain threshold is desired, such as by a user, administrator, service provider, or application (e.g., LBS application), the location component 140 can determine a corresponding time period in which the local positioning component 142 can operate between location fixes from the reference positioning component 144. Because the local positioning component 142 is used during this period, the period may be referred to as a local-positioning time period. Because the reference positioning system is used sparingly, only to provide the periodic location fixes, this arrangement results in significant battery conservation compared to the traditional arrangement using only the reference positioning system (e.g., GPS), without sacrificing accuracy beyond the set requirement.

The desired amount of maximum position error depends on one or more factors. Factors include, for example, (i) needs of an application (e.g., a LBS application), (ii) preferences of a user of the mobile device 100 (e.g., preference for low battery consumption, or for high position accuracy), (iii) environment in which the mobile device is operating (e.g., rural versus urban), (iv) remaining battery power, (v) battery-usage characteristics (set, for example, by a device manufacturer), and (vi) requirements of a service provider, such as a requirement that the device operate at a low-accuracy mode whenever the device is in rural areas, or unless an application requires a high accuracy, for example.

The amount of error tolerable by users and applications sometimes changes, from user to user or from application to application. Also, the same user or application may require more accurate positioning at times and less accuracy at other times. For example, a user travelling along a highway may be content with relatively low accuracy until they enter an urban area, at which time they would like relatively high accuracy.

Some LBS applications may require relatively high accuracy. It is also contemplated that though an LBS application may require relatively high positioning accuracy at times, the same LBS application could tolerate lower levels of positioning accuracy at other times. The requirement of an application for more or less accurate locating may depend, for example, on the task being performed by the LBS application and/or locations where the tasks are being performed. In these and other scenarios in which the location accuracy requirement changes, the local-positioning time period can be variable, changing from time to time, to match the required accuracy.

For situations in which greater accuracy is called for, the location component 140 obtains more frequent location fixes from the reference position component 144, proportionate to the amount of increased accuracy desired. For situations in which a lower amount of accuracy can be tolerated, the location component 140 obtains less frequent location fixes, proportionate to the amount of decreased accuracy.

In some embodiments, modes or levels of accuracy are created corresponding to various amounts of positioning error. For example, the location component 140 and/or the location server or mobile locating platform can include a high, a medium, and a low level of accuracy. Each level has a maximum error associated with it, and thus a corresponding amount of time that can pass before the location component 140 needs to obtain a new location fix from the reference position component 144. For the low level, position accuracy will be lower, especially toward the end of the corresponding time period, just before the next location fix, but the user will enjoy a corresponding conservation of battery power. For the high accuracy level, position accuracy is at its highest, and though battery drain is higher than the low and medium positioning levels, it will still be significantly lower than in conventional arrangements continuously using only a reference positioning component 144 (e.g., GPS).

In other embodiments, other numbers of level and increments between levels are used. For example, instead of only high, medium, and low accuracy levels, very high, high, medium-high, medium, medium-low, low, and very low levels may be used. As another example, numerical levels at unit increments, such as on a scale of 1-10, can be assigned. The levels may be very fine, such as including levels at increments of 0.1 between 0 and 100.

A user or application 108 may select a level corresponding to a desired amount of tolerable error. As such, for a selection of level 1, for example, the location component 140 would obtain a location fix periodically at a timing ensuring that location information provided to the user and/or application 108 does not exceed 1 meter. For a selection of level 12, the location component 140 would obtain a location fix periodically at a timing ensuring that location information provided to the user and/or application 108 does not exceed 12 meters, etc. In some embodiments, the user or application 108 is provided with an option to select a tolerable error. The user or application 108 selects 2 to ensure that the location information from the location component 140 does not exceed 2 meters, without the use of accuracy levels.

Equation (1), or other determined relationship between time and error in location determination of the local positioning component 142, are stored as computer-readable instructions (e.g., computer code) in the location component 140 and/or location server or mobile locating platform, and/or an associated memory (e.g., memory 106 of the mobile device 100 or a memory of the location server or mobile locating platform). Determination of the applicable period is in some embodiments performed onboard the mobile device 100, such as in the location component 140, and in some embodiments performed in the location server and delivered to the location component 140.

Some applications, onboard or external to the mobile device 100, such as LBS applications, may at times request position information from the location component 140. For embodiments in which various accuracy levels are stored in the location component 140, the requesting applications can request position information at a level matching needs of the application at the time. If locating needs of the application change during a task or between tasks, such as the application requiring location information with higher or lower accuracy, the requesting application can submit a subsequent request for position information at a different level, matching the new positioning error. The location component 140 obtains location fixes from the reference positioning component 144 at intervals corresponding to the requested accuracy level. In one contemplated embodiment, of the embodiments in which various accuracy amounts are stored in connection with accuracy levels, the levels include a default level (e.g., medium, or level 5 of 10), and the location component 140 sets the location determination at the default level when receiving requests for position that do not indicate a particular level.

It is contemplated that a user of the mobile device 100 may establish one or more user preferences related to accuracy at which the location component 140 determines location of the mobile device 100. The user can provide a preference in the mobile device 100 instructing the device 100 (e.g., the location component 140) to determine location at a low-accuracy level whenever location is requested while the device 100 is in rural areas. In some embodiments, the user provides such preference via the user interface (UI) 110, by way of the input/output (I/O) interface (e.g., keyboard) 118. In some embodiments, the user provides such preferences to a server (e.g., location server or mobile locating platform), such as via the Internet, and the server provides the preference to the location component 140 of the mobile device 100.

It is further contemplated that the location component 140, or an application 108 of the mobile device 100, and/or location server or mobile locating platform or associated server, may include a positioning-accuracy setup program, such as a step-by-step wizard. Users can establish preferences for accuracy determinations using the setup program. For embodiments in which the accuracy program is stored in the mobile device 100, the user may access the setup program to establish or change settings via the user UI 110, by way of the I/O interface 118. For embodiments in which the setup program is stored in a location server or mobile locating platform, or other server remote to the mobile device 100, the user may access the program via the Internet, such as by way of a home computer. In the latter example, the remote server transmits the preference(s) to the location component 140 of the mobile device 100 for use in determining location of the mobile device 100 accordingly.

As mentioned above, available battery life can be a factor affecting determination of positioning accuracy, and thus the corresponding time period between location fixes. For example, the location component 140 may be programmed to obtain location fixes from the reference positioning component 144 less frequently when the remaining battery life is relatively short, such as at or below a certain amount of remaining life (e.g., a percentage).

Figure 3:
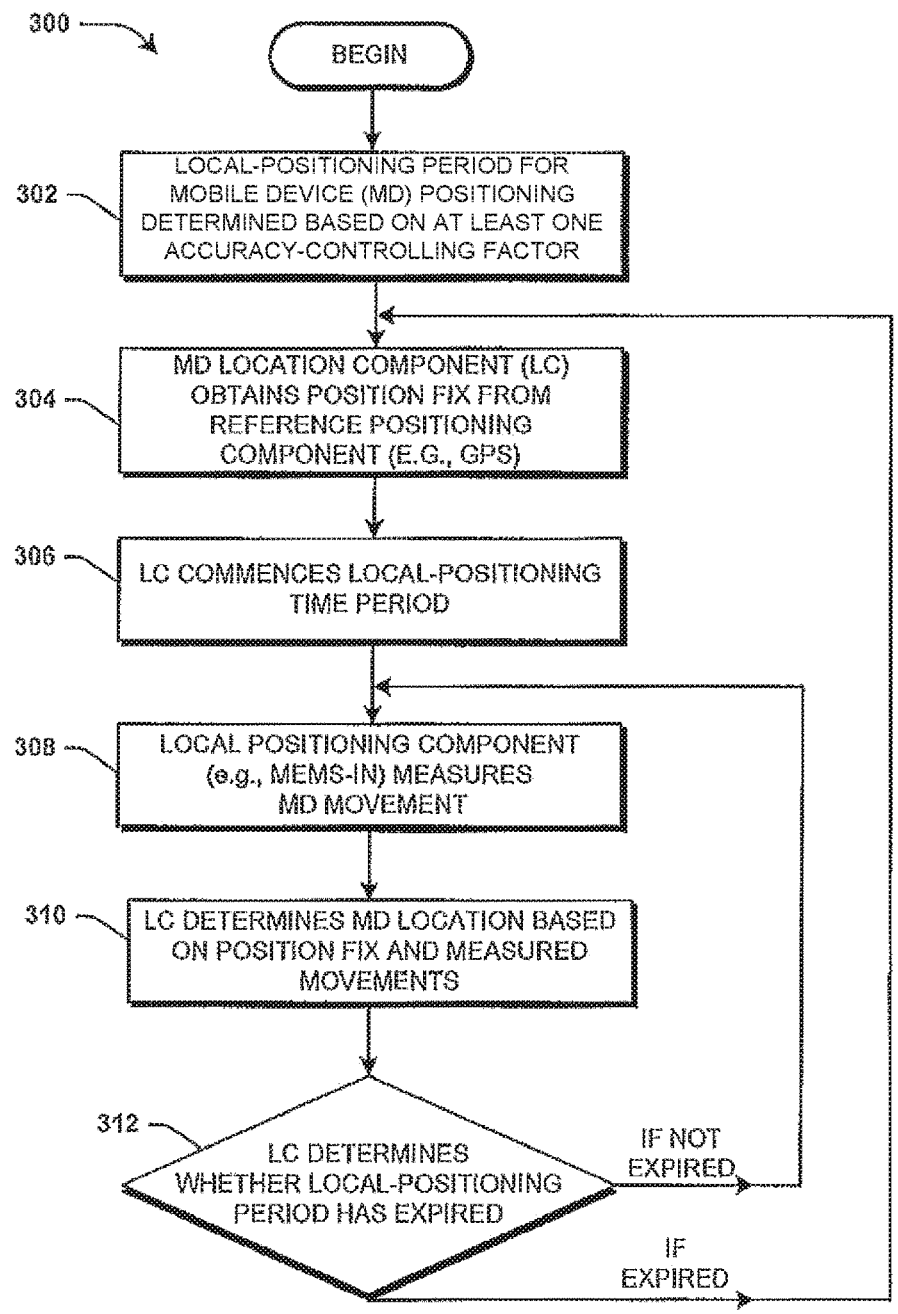
FIG. 3 illustrates an exemplary method for determining location of the mobile device, according to an embodiment of the present disclosure.

FIG. 3 shows an exemplary method 300 for determining a position of the mobile device 100, according to an embodiment of the present disclosure. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer readable medium, such as the memory 106 of the mobile device 100 and/or a memory module of a location server or mobile locating platform, for example.

The method 300 begins and flow proceeds to block 302, whereat a time period between location fixes from the reference positioning component 144 is determined. This period may be referred to as a local-positioning period, being the amount of time that the location component 140 relies on the local positioning component 142 (e.g., an INU, such as a MEMS-IN) and the most recent location fix for determining location of the mobile device 100. The location component 140 determining the local-positioning period may include obtaining, requesting/receiving, or just receiving information including a local-positioning period, or related information from which the local-positioning period can be determined.

Determination of the local-positioning period at step 302 may include obtaining, requesting/receiving, just receiving, and the like, and may be made by one or more individuals and programs depending on one or more of a variety of factors. For example, the local-positioning period, in various embodiments, depends on any one or more of: (i) needs of an application 108 on the mobile device 100 and/or application(s) remote to the mobile device 100 (e.g., a LBS application); (ii) preferences of a user of the mobile device 100; (iii) environment in which the mobile device 100 is located; (iv) remaining battery power; (v) battery-usage characteristics (set, for example, by a device manufacturer, by a service provider as a requirement, or by the user as a preference); (vi) requirements of a service provider; (vii) a quality of service associated with the user; and (viii) characteristics of network components.

Regarding determining the local-positioning period based on needs of an application, the location component 140 is, in some embodiments, configured to receive an instruction from the application for accuracy information at a certain level. Regarding determining the local-positioning period based on user preferences, the location application 108 is configured to set the period based on various user selections, such as selection of a low-battery-consumption preference and/or a high-positioning-accuracy preference. The location application 108 is, in some embodiments, configured to present options to the user for adjusting the accuracy at which the location component 140 determines position, and so indirectly adjusting the local-positioning period, in any of various ways. For example, the location application 108 is in some embodiments configured to present the user with radio buttons, toggle switches, numerical fields or pull down options, and/or sliding scales by which to select lower battery consumption, higher accuracy, or other user preferences directly or indirectly relating to the accuracy at which the location component 140 determines location of the mobile device 100. As further example, the location application 108 may present the user with options for higher/lower accuracy or higher/lower battery consumption depending on the situation, such as on weekends versus weekdays, in a home area versus away from home, and in an urban area versus a rural area.

Regarding determining the local-positioning period based on requirements of a service provider, the service provider may instruct the location component 140 to obtain location at a certain accuracy, or to maintain a certain local-positioning period, at all times, certain times, or under certain conditions. The service provider may set the accuracy or period based on any one or more factors, such as any of those mentioned herein, including, for example, network characteristics, battery-usage, time factors (e.g., weekends versus week days, and day versus night), or geographic parameters (e.g., rural versus urban). The service providers may provide instructions to the location component in any of a variety of ways, including at initial device setup, providing the instructions on a SIM card or UICC used with the mobile device, provisioning the instructions as a setup or update, other ways, and the like.

Regarding determining the local-positioning period based on quality of service associated with the user, the local-positioning period is, in some embodiments, set based on a level of service paid for by the user, or associated with the user for another reason (e.g., users using a certain type of mobile device, or based on how long the user has been a subscriber, etc.). Higher levels correspond to higher-accuracy positioning, and so lower local-positioning periods. In some scenarios, a user could pay for higher positioning accuracy, or pay for a service level that includes higher positioning accuracy amongst its benefits.

Regarding determining the local-positioning period based on characteristics of the network, the local-positioning period can be set or changed based on, for instance, demands on network-based position servers or other network components. For example, in some embodiments, the location component 140 is instructed, such as by a network component (e.g., server) to increase the local-positioning period in response to a determination that demand, or other characteristics associated with one or more network components, is too high or low, such as by being above or below a threshold level.

The method 300 includes the location component 140 obtaining a location fix from the reference positioning component 144, at step 304. For example, in embodiments in which the reference positioning component 144 includes a GPS receiver, the reference positioning component 144 determines a present location of the mobile device 100 and provides it to the location component 140. In some contemplated embodiments, the reference positioning component 144 repeatedly obtains and reports to the location component 140 the present location at set times or intervals according to instruction received from the location component 140 indicating when location information is desired. In some embodiments, the reference positioning component 144 obtains and reports the location to the location component 140 in response to instructions or requests from the location component 140 each time the location is needed.

The method 300 further includes the location component 140 commencing the local-positioning time period, at step 306, and the local positioning component 142 (e.g., MEMS-IN or other INU) measuring movement of the mobile device 100, at step 308. In some embodiments, the location component 140 includes a timer or clock for tracking time, and in others the location component 140 uses a timer or clock of the mobile device 100 that is not dedicated to the location component 140. The location component 140 measures movement of the mobile device 100, as described above, and produces corresponding movement data, including, for example, data about displacements of the mobile device 100 in one or more linear or angular directions.

At step 310, the location component 140 determines a present location of the mobile device 100 based on the most recent location fix from the reference positioning component 144 and the movements measured by the local positioning component 142. As a general example, if the most recent location fix places the device at a certain latitude LAT and longitude LONG, and the local positioning component 142 determines that the mobile device 100 has moved 150 meters North and 100 meters West since the most recent location fix, the location component 140 can determine that a present location $LAT_1$, $LONG_1$ of the mobile device 100 is the most recent fix LAT, LONG plus the movements, or LAT+(latitudinal degrees corresponding to 150 meters), LONG−(longitudinal degrees corresponding to 100 meters).

The location component 140 may determine location using the most recent location fix and the movement data in various ways. For example, in some embodiments, the local positioning component 142 is configured to create movement data representing all movement of the mobile device 100 since the most recent location fix, and provide the movement data to the location component 140. The location component 140 can then determine a present location of the mobile device 100 based on the location fix and cumulative movements since the fix. Thus, using the simplified example provided above, if, after the location component 140 determines that a present location $LAT_1$, $LONG_1$ of the mobile device is the most recent fix LAT, LONG plus the movement data [LAT+(latitudinal degrees corresponding to 150 meters), LONG−(longitudinal degrees corresponding to 100 meter)], the mobile device then moves another 200 meters North and 230 meters West, the location component 140 could determine that the mobile device is located at $LAT_2$, $LONG_2$, being LAT+(latitudinal degrees corresponding to 350 meters), LONG−(longitudinal degrees corresponding to 330 meters).

As another example, in some embodiments, the local positioning component 142 is configured to create movement data and provide the data to the location component 140. The location component 140 determines a most recent location of the mobile device 100 based upon most recent movement data (i.e., movement since the last position fix) and the location determined based on the last-provided movement data. In this way, too, the location component 140 determines location of the mobile device 100 based on the most-recent location fix and movement data. Using the example above, if, after the location component 140 determines the present location $LAT_1$, $LONG_1$ as described, the mobile device 100 moves most recently (i.e., since the last determination of present location) another 200 meters North and 230 meters West, the location component 140 could determine that the most recent location $LAT_2$, $LONG_2$ is $LAT_1$+(latitudinal degrees corresponding to 200 meters), $LONG_1$−(latitudinal degrees corresponding to 230 meters). For an initial locating under this embodiment, because there is no previously-determined location, the location component 140 determines the initial location based on the initial location fix and movements of the mobile device 100 since the initial location fix.

Continuing to step 312 of the method 300, the location component 140 determines whether the local-positioning time period has expired. If the local-positioning time period has not expired, then flow proceeds back to step 308, whereat the local positioning component 142 continues to measure new movements of the mobile device 100, and step 310, whereat the location component 140 determines new locations of the mobile device 100 based on the measured new movements and the location fix. Although the step 308 of measuring movements is shown as a distinct step in FIG. 3, it should be appreciated that the local positioning component 142 in some embodiments continuously measures movement of the mobile device 100. The location component 140 uses the resulting movement data, and the location fix information, to determine an accurate present location of the mobile device 100.

If it is determined at step 312 that the local-positioning time period has expired, then flow proceeds back to step 304 to obtain a new location fix from the reference positioning component 144, and step 306 to start a new local-positioning time period. The new local-positioning time period may be the same or different than the previous local-positioning time period. For example, if a user or LBS application communicates to the location component 140 that more or less accurate position information is now required (or, for example, that less battery consumption during locating is desired), the location component 140 changes the local-positioning time period accordingly.

The location component 140 determines location of the mobile device 100 based on the new location fix and movements measured by the local positioning component 144, in steps 308, 310, 312, until it is determined at step 312 that a fresh location fix is called for. The method 300 may end in various ways, such as in response to the user turning off the mobile device or closing an application (e.g., LBS application) that initiated locating operations.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, by a processor of a mobile device, from a location-based services application executing on the mobile device, a selection, at a first time, of a first level corresponding to a first amount of error;
calculating, by the processor, based at least in part on the first level corresponding to the first amount of error, a first local-positioning time period;
determining, by the processor, based on information from a reference positioning component of the mobile device, a first reference geographic location of the mobile device;
determining, by the processor, during the first local-positioning time period, a first geographic location of the mobile device based on the first reference geographic location of the mobile device and movements of the mobile device measured by a local positioning component of the mobile device during the first local-positioning time period;
upon expiration of the first local-positioning time period, determining, by the processor, based on information from the reference positioning component of the mobile device, a second reference geographic location of the mobile device;
receiving, by the processor, from the location-based services application executing on the mobile device, a selection, at a second time, of a second level corresponding to a second amount of error, wherein the second amount of error is higher than the first amount of error;
calculating, by the processor, based at least in part on the second level corresponding to the second amount of error, a second local-positioning time period, wherein the second local-positioning time period is greater than the first local-positioning time period based at least in part on the second amount of error being higher than the first amount of error;
determining, by the processor, during the second local-positioning time period, a second geographic location of the mobile device based on the second reference geographic location of the mobile device and movements of the mobile device measured by the local positioning component of the mobile device during the second local-positioning time period;
receiving, by the processor, from a network server, an instruction to increase the second local-positioning time period based on demand associated with the network server; and
in response to the instruction from the network server, calculating, by the processor, a third local-positioning time period, wherein the third local-positioning time period is greater than the first local-positioning time period and the second local-positioning time period.

2. The method of claim 1, wherein the first local-positioning time period corresponds to a first amount of time until the local positioning component accumulates the first amount of error, and wherein the second local-positioning time period corresponds to a second amount of time until the local positioning component accumulates the second amount of error.

3. The method of claim 2, wherein the first amount of time until the local positioning component accumulates the first amount of error is a function of the first amount of error and of a noise density of the local positioning component.

4. The method of claim 1, wherein the location-based services application selects, at the first time, the first level corresponding to the first amount of error and selects, at the second time, the second level corresponding to the second amount of error based on a first task being performed by the location-based services application at the first time that requires a more accurate positioning than a second task being performed by the location-based services application at the second time.

5. The method of claim 1, wherein the location-based services application selects, at the first time, the first level corresponding to the first amount of error and selects, at the second time, the second level corresponding to the second amount of error based on a first location where tasks are being performed at the first time by the location-based services application and a second location where tasks are being performed at the second time by the location-based services application.

6. The method of claim 1, wherein the reference positioning component includes a global positioning system receiver and the local positioning component includes an inertial navigation unit.

7. A mobile device comprising:
a local positioning component;
a reference positioning component;
a processor; and
a memory that stores instructions that, when executed by the mobile device, cause the mobile device to perform operations comprising
receiving, from a location-based services application executing on the mobile device, a selection, at a first time, of a first level corresponding to a first amount of error,
calculating based at least in part on the first level corresponding to the first amount of error, a first local-positioning time period,
determining, based on information from the reference positioning component of the mobile device, a first reference geographic location of the mobile device,
determining, during the first local-positioning time period, a first geographic location of the mobile device based on the first reference geographic location of the mobile device and movements of the mobile device measured by the local positioning component of the mobile device during the first local-positioning time period,
upon expiration of the first local-positioning time period, determining, based on information from the reference positioning component of the mobile device, a second reference geographic location of the mobile device,
receiving, from the location-based services application executing on the mobile device, a selection, at a second time, of a second level corresponding to a second amount of error, wherein the second amount of error is higher than the first amount of error,
calculating, based at least in part on the second level corresponding to the second amount of error, a second local-positioning time period, wherein the second local-positioning time period is greater than the first local-positioning time period based at least in part on the second amount of error being higher than the first amount of error,
determining, during the second local-positioning time period, a second geographic location of the mobile device based on the second reference geographic location of the mobile device and movements of the mobile device measured by the local positioning component of the mobile device during the second local-positioning time period,
receiving, from a network server, an instruction to increase the second local-positioning time period based on demand associated with the network server, and
in response to the instruction, calculating a third local-positioning time period, wherein the third local-positioning time period is greater than the first local-positioning time period and the second local-positioning time period.

8. The mobile device of claim 7, wherein the first local-positioning time period corresponds to a first amount of time until the local positioning component accumulates the first amount of error, and wherein the second local-positioning time period corresponds to a second amount of time until the local positioning component accumulates the second amount of error.

9. The mobile device of claim 8, wherein the first amount of time until the local positioning component accumulates the first amount of error is a function of the first amount of error and of a noise density of the local positioning component.

10. The mobile device of claim 7, wherein the location-based services application selects, at the first time, the first level corresponding to the first amount of error and selects, at the second time, the second level corresponding to the second amount of error based on a first task being performed by the location-based services application at the first time that requires a more accurate positioning than a second task being performed by the location-based services application at the second time.

11. The mobile device of claim 7, wherein the location-based services application selects, at the first time, the first level corresponding to the first amount of error and selects, at the second time, the second level corresponding to the second amount of error based on a first location where tasks are being performed at the first time by the location-based services application and a second location where tasks are being performed at the second time by the location-based services application.

12. The mobile device of claim 7, wherein the reference positioning component includes a global positioning system receiver and the local positioning component includes an inertial navigation unit.

* * * * *